Patented July 11, 1939

2,165,435

UNITED STATES PATENT OFFICE 2,165,435

PROCESS FOR MELTING, CASTING, AND PURIFYING SUCROSE OCTANITRATE

Joseph A. Wyler, Allentown, Pa., assignor to Trojan Powder Company, Allentown, Pa.

No Drawing. Application October 8, 1937, Serial No. 168,038

3 Claims. (Cl. 260—235)

My invention relates to a process for melting, casting, and purifying sucrose octanitrate.

One object of this invention is to provide a relatively safe method for melting and casting sucrose octanitrate. Another object is to provide a method for melting sucrose octanitrate without causing any appreciable decomposition of the sucrose octanitrate undergoing fusion. A still further object is to provide a method for the purification of sucrose octanitrate whereby the relatively purer sucrose octanitrate is caused to separate, in molten condition, from such impurities as are relatively insoluble in the sucrose octanitrate.

Other and further objects of this invention will become apparent upon further perusal of the following specification and claims.

Sucrose octanitrate is a white, or colorless crystalline product of a melting point in the neighborhood of 86° C. Upon fusion it forms a colorless, water-clear liquid and upon cooling, it forms a crystalline, opaque mass. Due to the relatively poorer stability of sucrose octanitrate as compared to such other explosives as trinitrotoluene, this fusion must be carried out with the observance of unusual precautions.

I have discovered that, while the aliphatic monohydroxy alcohols have a distinct solvent effect upon sucrose ostanitrate, the latter has merely a slight solvent effect for these alcohols. I have also discovered that if crystalline sucrose octanitrate be treated with a subordinate amount of an aliphatic monohydroxy alcohol and then subjected to a heating operation, that the sucrose octanitrate fuses without any observable decomposition, forms a clear, colorless liquid layer and allows the alcohol to separate as a clear upper layer, thus providing an effective means for separating the molten sucrose octanitrate essentially free from alcohol and also for providing sucrose octanitrate in a molten condition ready for pouring into any suitable container.

It should be noted that the separation of the molten sucrose octanitrate as a clear liquid and not as an emulsion, increases the utility of my process very substantially. Also, since molten sucrose octanitrate exhibits only a slight solvent effect for the aliphatic monohydric alcohols, it therefore separates from these alcohols in a very pure condition, by simple settling at a temperature above the melting point of the sucrose octanitrate. Thus, it will be clear that my invention also comprehends the process of separating sucrose octanitrate from aliphatic monohydric alcohols when the latter are present in the crystalline sucrose octanitrate, as is the case when sucrose octanitrate is crystallized out of alcoholic solutions and the crytsals separated on a filter, leaving some alcohol adhering to the crystals.

The following example of how I may carry out my process is given by way of illustration and for purposes of clarity.

Sucrose octanitrate, containing say about 15% of amyl alcohol, is placed in a steam jacketed kettle provided with a bottom plug outlet and the kettle then heated by means of the steam. The sucrose octanitrate begins to melt at the inner surface of the kettle and an immediate separation of the sucrose octanitrate from the amyl alcohol commences. The amyl alcohol floats upon the liquid sucrose nitrate and a colorless, water-clear sucrose nitrate may be drained out of the kettle through the bottom outlet.

The amyl alcohol layer may be cyclically used over again or its constituents may be recovered in a purified form by any suitable method.

Although in the example given, mention is made only of amyl alcohol, other aliphatic monohydric alcohols as methyl, ethyl, propyl, butyl and hexyl or mixtures of two or more of the monohydric aliphatic alcohols containing not more than six carbon atoms, are the full equivalent of amyl alcohol. Furthermore, the percentage of the alcohol present in the sucrose octanitrate may vary over wide limits. As little as one-half of one percent of ethyl alcohol has been found efficacious and there is no reason to believe that lesser amounts would not exhibit usefulness in my process.

The alcohols serve to form a protective layer around the crystals, which layer causes a more uniform and even distribution of heat to the crystals, and to exert a strong solvent effect for the lower oxides of nitrogen, thus improving the stability of the sucrose octanitrate by removing traces of these oxides of nitrogen therefrom.

A mixture of alcohols that has been used to advantage is one containing ethyl and amyl alcohols.

The above example, being given for purposes of illustration, is not intended to limit my invention in any way. Thus, I may use any suitable melting apparatus, any suitable temperature or any suitable proportion of alcohol or alcohols to sucrose octanitrate and I do not limit myself except as indicated in the appended claims.

I claim:

1. The process of melting and purifying sucrose octanitrate which comprises melting the sucrose octanitrate in a monohydric aliphatic alcohol containing not more than six carbon atoms to the molecule and in amount sufficient to form an alcoholic extract of impurities originally present in the octanitrate, allowing the molten octanitrate to separate as a layer below the alcoholic extract, and then drawing off the said layer.

2. The process of melting and purifying sucrose octanitrate which comprises melting the sucrose octanitrate in a mixture of ethyl and amyl alcohols in amount sufficient to form an alcoholic extract of impurities originally present in the octanitrate, allowing the molten octanitrate to separate as a layer below the alcoholic extract, and then drawing off the said layer.

3. The process of melting and purifying sucrose octanitrate which comprises melting the sucrose octanitrate in one-half to fifteen percent of a monohydric aliphatic alcohol containing not more than six carbon atoms to the molecule, so as to form an alcoholic extract of impurities originally present in the octanitrate, allowing the molten octanitrate to separate as a layer below the alcoholic extract, and drawing off the said layer.

JOSEPH A. WYLER.